(12) United States Patent
Yoneda et al.

(10) Patent No.: US 12,305,653 B2
(45) Date of Patent: May 20, 2025

(54) COMPRESSOR SYSTEM

(71) Applicants: MITSUBISHI HEAVY INDUSTRIES COMPRESSOR CORPORATION, Tokyo (JP); MITSUBISHI HEAVY INDUSTRIES, LTD., Tokyo (JP)

(72) Inventors: Keizo Yoneda, Hiroshima (JP); Takeshi Hataya, Hiroshima (JP); Nobuyuki Horii, Kanagawa (JP)

(73) Assignees: MITSUBISHI HEAVY INDUSTRIES COMPRESSOR CORPORATION, Tokyo (JP); MITSUIBSHI HEAVY INDUSTRIES, LTD., Tokyo (JP)

( * ) Notice: Subject to any disclaimer, the term of this patent is extended or adjusted under 35 U.S.C. 154(b) by 202 days.

(21) Appl. No.: 17/778,217

(22) PCT Filed: Dec. 7, 2020

(86) PCT No.: PCT/JP2020/045460
§ 371 (c)(1),
(2) Date: May 19, 2022

(87) PCT Pub. No.: WO2021/124953
PCT Pub. Date: Jun. 24, 2021

(65) Prior Publication Data
US 2022/0412366 A1    Dec. 29, 2022

(30) Foreign Application Priority Data

Dec. 20, 2019   (JP) .................................. 2019-230295

(51) Int. Cl.
*F04D 25/04*   (2006.01)
*F01D 17/20*   (2006.01)
(Continued)

(52) U.S. Cl.
CPC ............. *F04D 25/04* (2013.01); *F01D 17/20* (2013.01); *F02C 3/045* (2013.01); *F02C 3/10* (2013.01);
(Continued)

(58) Field of Classification Search
CPC ............... F02C 6/02; F02C 3/22; F04D 25/04
See application file for complete search history.

(56) References Cited

U.S. PATENT DOCUMENTS 6,640,586 B1 * 11/2003 Baudat .................. F25J 1/0284
62/611
2005/0022552 A1    2/2005 Lucas et al.
(Continued)

FOREIGN PATENT DOCUMENTS

JP    2006-283596 A    10/2006
JP    2011-027047 A    2/2011
(Continued)

OTHER PUBLICATIONS

International Search Report in corresponding International Application No. PCT/JP2020/045460, dated Jan. 19, 2021 (4 pages).
(Continued)

*Primary Examiner* — Gerald L Sung
(74) *Attorney, Agent, or Firm* — Osha Bergman Watanabe & Burton LLP

(57) ABSTRACT

The present invention provides a compressor system including a plurality of compressor trains each including a gas turbine and a compression part including a compressor driven by the gas turbine, and a fluid feeding part for distributing a fluid fed from one fluid source to each of the compressors in the plurality of compressor trains. The gas turbine includes a gas turbine compressor for compressing air, a combustor for generating a combustion gas, a high-pressure turbine including a high-pressure turbine rotor
(Continued)

mechanically coupled to a compressor rotor, and a low-pressure turbine including a low-pressure turbine rotor disposed away from the high-pressure turbine rotor. The plurality of compressor trains can be operated in parallel.

5 Claims, 1 Drawing Sheet

(51) Int. Cl.
  F02C 3/045 (2006.01)
  F02C 3/10 (2006.01)
  F02C 6/00 (2006.01)
  F04D 27/00 (2006.01)
(52) U.S. Cl.
  CPC .............. *F02C 6/00* (2013.01); *F04D 27/009* (2013.01); *F05D 2220/32* (2013.01); *F05D 2220/74* (2013.01); *F05D 2260/606* (2013.01)

(56) References Cited

U.S. PATENT DOCUMENTS

| | | | | |
|---|---|---|---|---|
| 2008/0008602 | A1* | 1/2008 | Pozivil | F04D 29/5833 417/247 |
| 2009/0260367 | A1* | 10/2009 | Martin | F25J 1/0298 165/96 |
| 2010/0058801 | A1* | 3/2010 | Masani | F25J 1/0022 62/611 |
| 2012/0011857 | A1* | 1/2012 | Becker | F02C 7/12 700/282 |
| 2013/0145794 | A1* | 6/2013 | Rasmussen | F25J 1/0052 62/611 |
| 2015/0176485 | A1 | 6/2015 | Gabelloni et al. | |
| 2018/0016976 | A1 | 1/2018 | Kobayashi et al. | |
| 2018/0180053 | A1 | 6/2018 | Gallinelli et al. | |
| 2018/0209337 | A1* | 7/2018 | Russo | F01D 25/28 |

FOREIGN PATENT DOCUMENTS

| | | |
|---|---|---|
| JP | 2015-524532 A | 8/2015 |
| WO | 2016-129030 A1 | 8/2016 |

OTHER PUBLICATIONS

Written Opinion in corresponding International Application No. PCT/JP2020/045460, dated Jan. 19, 2021 (8 pages).

* cited by examiner

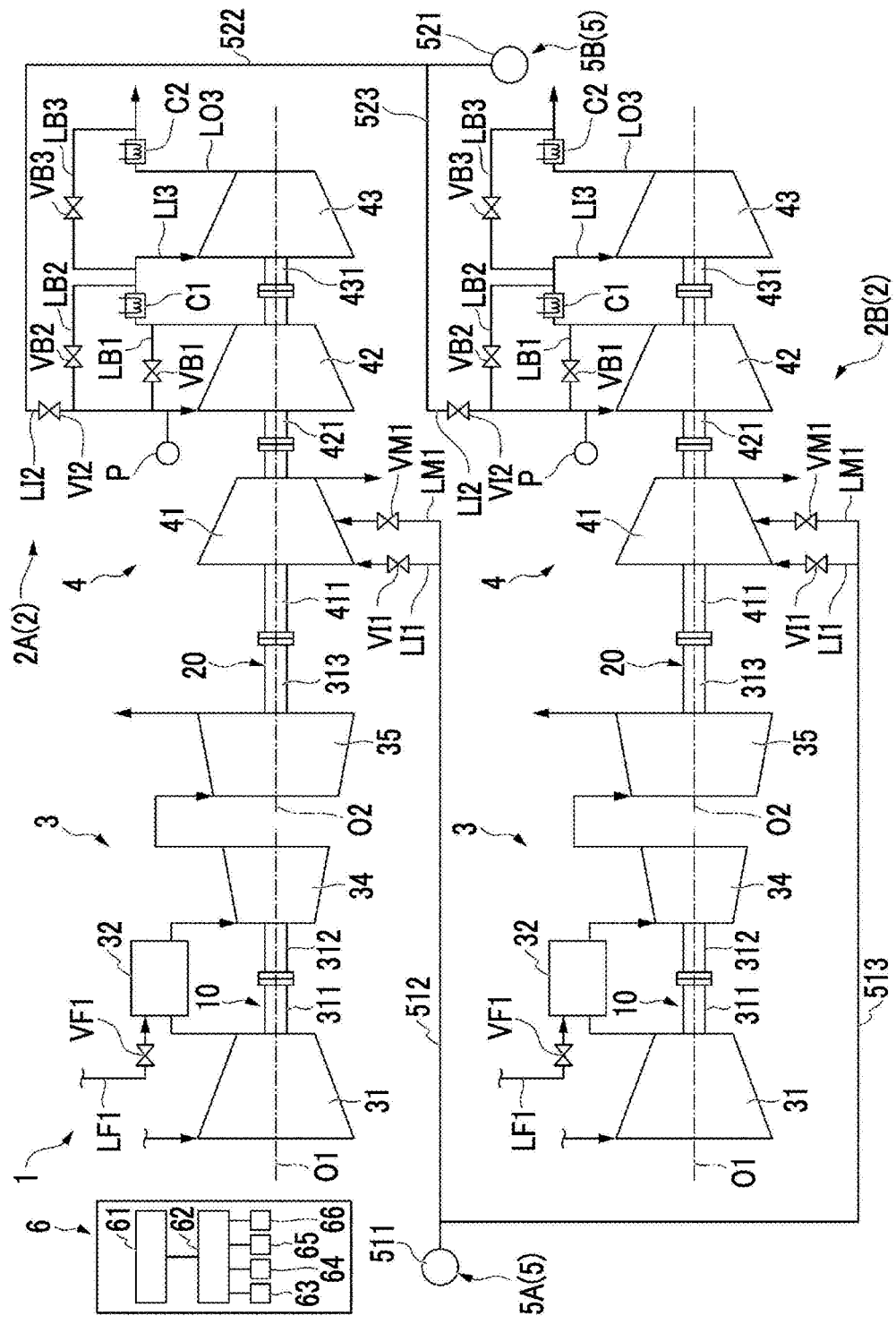

COMPRESSOR SYSTEM

TECHNICAL FIELD

The present disclosure relates to a compressor system. Priority is claimed on Japanese Patent Application No. 2019-230295 filed on Dec. 20, 2019, the content of which is incorporated herein by reference.

BACKGROUND ART

A compressor system that is used in an LNG plant or the like is composed of a compressor train (string) obtained by connecting a single compressor or a plurality of compressors to an output shaft of a gas turbine, which is a driving machine, and the compressor system is used to compress a fluid. In the LNG plant, the compressor system is used as a refrigerating device at the time of production of an LNG. One compressor train or a plurality of trains are disposed with respect to one plant.

In the case of a plurality of compressor trains, if discharge from a compressor is blocked due to some failure, a compressed refrigerant is sent to a pipe or a flare and is discharged to the outside. However, there is a case where the pressure of the refrigerant discharged in this manner is considerably high. In a case where a pipe or a flare with which it is possible to cope with discharge of a high-pressure refrigerant is installed, the size of the pipe or the flare is large and thus there is an increase in cost of installation, maintenance, or the like or an increase in size a space for installation.

With regard to this, for example, in PTL 1, a recycle valve (ASV) is installed downstream of a compressor. When the discharge pressure of the compressor exceeds a designated pressure, a recycle valve is opened so that a compressed fluid circulates and the flow rate of the fluid passing through the compressor increases. Accordingly, a load on the compressor is increased so that a decrease in rotation speed (bogging down) of the compressor is caused to occur intentionally. Therefore, the compressor is stopped. As a result, an increase in pressure of a discharged refrigerant is suppressed even in the case of an emergency situation and the size of a pipe or a flare to be installed is not made large.

CITATION LIST

Patent Literature

[PTL 1] U.S. Unexamined Patent Application Publication No. 2005-0022552

SUMMARY OF INVENTION

Technical Problem

Meanwhile, a decrease in rotation speed of the compressor may occur unintentionally. For example, there is a case where, in a state where one compressor train is stopped, another compressor train in a normal state continues to be operated. In such a case, a fluid such as a refrigerant to be supplied to a compressor of the stopped compressor train is supplied to a compressor of the other compressor train that is in operation. As a result, a load on the compressor of the compressor train that is in operation becomes temporarily high and the rotation speed of the compressor is decreased. Furthermore, since the rotation speed of the compressor is unintentionally decreased, in a gas turbine connected to the compressor, the amount of air used for combustion may decrease and the output thereof may not be maintained. As a result, the rotation speed of the compressor may be further decreased and emergency stoppage (trip) of the compressor train may occur in the end. If the compressor train is unintentionally stopped, a large load may act on various devices including a gas turbine and the compressor and malfunction or the like may occur in addition to stoppage of production in a plant. In addition, although an unintentional decrease in rotation speed of the compressor that is caused by occurrence of stoppage of one compressor train has been used as an example in the above description, an unintentional decrease in rotation speed of the compressor may be caused by another factor. That is, an unintentional decrease in rotation speed of the compressor may be caused by various factors.

The present disclosure provides a compressor system in which unintentional stoppage of a compressor train is suppressed and operation can be stably continued.

Solution to Problem

According to an aspect of the present disclosure, there is provided a compressor system including a plurality of compressor trains each of which includes a multi-shaft gas turbine and a compression unit including at least one compressor driven by the multi-shaft gas turbine and a fluid supply unit that includes one fluid supply source and distributes and supplies a fluid supplied from the fluid supply source to the compressors of the plurality of compressor trains. The multi-shaft gas turbine includes a gas turbine compressor that includes a compressor rotor and compresses air with rotation of the compressor rotor, a combustor that produces a combustion gas by using the air compressed by the gas turbine compressor and fuel, a high-pressure turbine that includes a high-pressure turbine rotor that is mechanically connected to the compressor rotor and is rotationally driven by the combustion gas, and a low-pressure turbine that includes a low-pressure turbine rotor disposed to be separated from the high-pressure turbine rotor and rotationally driven by the combustion gas after the high-pressure turbine rotor is rotationally driven and the plurality of compressor trains are able to be operated in parallel.

Advantageous Effects of Invention

According to a compressor system of the present disclosure, it is possible to suppress unintentional stoppage of a compressor train and operation can be stably continued.

BRIEF DESCRIPTION OF DRAWINGS

FIG. 1 is a schematic view showing a configuration of a compressor system according to an embodiment of the present disclosure.

DESCRIPTION OF EMBODIMENTS

Hereinafter, an embodiment of a centrifugal compressor according to the present disclosure will be described with reference to the accompanying drawings. However, the present disclosure is not limited to the embodiment only.
(Configuration of Compressor System)

Hereinafter, a compressor system 1 according to the embodiment of the present disclosure will be described with reference to FIG. 1.

As shown in FIG. 1, the compressor system 1 includes a plurality of (two in present embodiment) compressor trains 2, a plurality of (two in present embodiment) fluid supply units 5, and a control unit 6. In the present embodiment, a case where the compressor system 1 is applied to an LNG plant will be described as an example. A plant in which the compressor system 1 is used is not limited to an LNG plant. The compressor system 1 can be used in various plants in which a fluid needs to be compressed. Therefore, the compressor system 1 may be applied to an ethylene plant in which ethylene is produced by separating and purifying raw materials such as naphtha.

(Compressor Train)

The compressor train 2 includes a two-shaft gas turbine 3 and a compression unit 4 including at least one compressor. The compressor train 2 of the present embodiment compresses a plurality of fluids by means of a plurality of compressors driven by one gas turbine 3, which is a driving machine. The plurality of compressor trains 2 can be operated in parallel. Here, being operated in parallel means being operated at the same time. When being operated in parallel, the plurality of compressor trains 2 may be operated under the same operating conditions or may be operated under different operating conditions. The compressor system 1 of the present embodiment includes two compressor trains 2, which are a first compressor train 2A and a second compressor train 2B. In the present embodiment, the configuration of the first compressor train 2A and the configuration of the second compressor train 2B are the same as each other.

(Two-Shaft Gas Turbine)

The two-shaft gas turbine 3 generates a rotational driving force for driving the compressor of the compression unit 4. The two-shaft gas turbine 3 includes a gas turbine compressor 31, a combustor 32, a high-pressure turbine 34, and a low-pressure turbine 35. In addition, the gas turbine 3, which is a driving machine, is intended to be a multi-shaft type gas turbine (two-shaft type in present embodiment) and is not limited to a two-shaft type gas turbine as shown in FIG. 1.

The gas turbine compressor 31 compresses air to generate compressed air. The gas turbine compressor 31 includes a compressor rotor 311 that rotates around a first axis O1. A motor (not shown) is connected to the compressor rotor 311 as a starter used when starting the compressor rotor 311. The gas turbine compressor 31 compresses air taken in from the outside with rotation of the compressor rotor 311 to generate compressed air and supplies the compressed air to the combustor 32.

The combustor 32 produces a combustion gas by using the air compressed by the gas turbine compressor 31 and fuel. The combustion gas generated in the combustor 32 is supplied to the high-pressure turbine 34. A fuel supply path LF1, which is a pipe connected to a fuel supply source, is connected to the combustor 32. A fuel supply valve VF1 is disposed in the fuel supply path LF1. It is possible to change the flow rate of fuel flowing through the fuel supply path LF1 by adjusting the opening degree of the fuel supply valve VF1. Therefore, the amount of fuel supplied to the combustor 32 is adjusted when the opening degree of the fuel supply valve VF1 is adjusted.

The high-pressure turbine 34 includes a high-pressure turbine rotor 312 that rotates around the first axis O1. The high-pressure turbine rotor 312 is rotationally driven by the combustion gas generated in the combustor 32. Therefore, the high-pressure turbine 34 is driven by the combustion gas supplied from the combustor 32. The high-pressure turbine rotor 312 is mechanically connected to the compressor rotor 311. Both of the compressor rotor 311 and the high-pressure turbine rotor 312 have a columnar shape centered on the first axis O1. The compressor rotor 311 and the high-pressure turbine rotor 312 are connected to each other to constitute a first rotor 10.

The low-pressure turbine 35 includes a low-pressure turbine rotor 313 that rotates around a second axis O2. The second axis O2 extends on the same axis as the first axis O1 and to be parallel with the first axis O1. The low-pressure turbine rotor 313 is rotationally driven by the combustion gas after the high-pressure turbine rotor 312 is rotationally driven. Therefore, the low-pressure turbine 35 is driven by the combustion gas which is an exhaust gas from the high-pressure turbine 34. The low-pressure turbine rotor 313 is disposed to be separated from the high-pressure turbine rotor 312 in a direction in which the first axis O1 and the second axis O2 extend. The low-pressure turbine rotor 313 and a rotor of the compression unit 4, which will be described later, are mechanically connected to each other to constitute a second rotor 20.

As described above, the gas turbine 3 is a so-called two-shaft type gas turbine in which the first rotor 10 and the second rotor 20 are not directly connected to each other. Therefore, the second rotor 20 can rotate independently of rotation of the first rotor 10. With the two-shaft gas turbine 3 having such a structure, it is possible to adjust the rotation speed of the second rotor 20 in accordance with a load while rotating and operating the first rotor 10 under optimum conditions.

(Compression Unit)

The compression unit 4 compresses a supplied fluid by means of the two-shaft gas turbine 3. The compression unit 4 of the present embodiment compresses a refrigerant of a chiller used to liquefy a natural gas, for example, in an LNG plant. The compression unit 4 of the present embodiment includes three compressors which are a first compressor 41, a second compressor 42, and a third compressor 43.

The first compressor 41 is a centrifugal compressor that compresses propane which is an example of a fluid. The first compressor 41 includes a first compression unit rotor 411 that rotates around the second axis O2. The first compression unit rotor 411 is mechanically connected to the low-pressure turbine rotor 313. That is, the first compression unit rotor 411 constitutes a portion of the second rotor 20. The first compressor 41 compresses the propane with rotation of the first compression unit rotor 411 to generate a compressed gas. The propane compressed by the first compressor 41 is sent to another facility of the plant.

The first compressor 41 is connected to a first inlet flow path LI1 and a first intermediate flow path LM1 connected to one of the fluid supply units 5 which will be described later. The first inlet flow path LI1 and the first intermediate flow path LM1 are pipes through which propane supplied from a first fluid supply unit 5A, which is the fluid supply unit 5, is supplied into the first compressor 41. The first inlet flow path LI1 is connected to a suction port of the first compressor 41. A first inlet valve VI1 is disposed in the first inlet flow path LI1. It is possible to change the flow rate of propane flowing through the first inlet flow path LI1 by adjusting the opening degree of the first inlet valve VI1. Therefore, the amount of propane supplied from the first fluid supply unit 5A to the suction port of the first compressor 41 is adjusted when the opening degree of the first inlet valve VI1 is adjusted. The first intermediate flow path LM1 is connected to an intermediate stage of the first compressor 41 that is positioned downstream of the suction port of the first compressor 41. A first intermediate valve VM1 is disposed in the first intermediate flow path LM1. It is possible to change the flow rate of propane flowing through the first intermediate flow path LM1 by adjusting the opening degree of the first intermediate valve VM1. Therefore, the amount of propane supplied from the first fluid supply unit 5A to the intermediate stage of the first compressor 41 is adjusted when the opening degree of the first intermediate valve VM1 is adjusted. That is, the first inlet valve VI1 and the first intermediate valve VM1 are so-called suction valves.

The second compressor 42 is a centrifugal compressor that compresses a mixed refrigerant containing nitrogen, methane, propane, and the like, which is an example of a fluid. The second compressor 42 includes a second compression unit rotor 421 that rotates around the second axis O2. The second compression unit rotor 421 is mechanically connected to the first compression unit rotor 411. That is, the second compression unit rotor 421 constitutes a portion of the second rotor 20. The second compressor 42 is disposed to be separated from the first compressor 41 in a direction in which the second axis O2 extends while being at a position opposite to the gas turbine 3. The second compressor 42 compresses the mixed refrigerant with rotation of the second compression unit rotor 421 to generate a compressed gas.

The second compressor 42 is connected to a second inlet flow path LI2 connected to one of the fluid supply units 5 which will be described later. The second inlet flow path LI2 is a pipe through which a mixed refrigerant supplied from a second fluid supply unit 5B, which is the fluid supply unit 5, is supplied into the second compressor 42. The second inlet flow path LI2 is connected to a suction port of the second compressor 42. A second inlet valve VI2 and a pressure sensor P (pressure value acquisition unit) are disposed in the second inlet flow path LI2. It is possible to change the flow rate of the mixed refrigerant flowing through the second inlet flow path LI2 by adjusting the opening degree of the second inlet valve VI2. Therefore, the amount of the mixed refrigerant supplied from the second fluid supply unit 5B to the suction port of the second compressor 42 is adjusted when the opening degree of the second inlet valve VI2 is adjusted.

The pressure sensor P acquires the value of a pressure at the suction port of the second compressor 42. The pressure sensor P sends information on the acquired pressure value to the control unit 6, which will be described later.

The third compressor 43 is a centrifugal compressor that compresses the mixed refrigerant compressed by the second compressor 42. The third compressor 43 includes a third compression unit rotor 431 that rotates around the second axis O2. The third compression unit rotor 431 is mechanically connected to the second compression unit rotor 421. That is, the third compression unit rotor 431 constitutes a portion of the second rotor 20. The third compressor 43 is disposed to be separated from the second compressor 42 in a direction in which the second axis O2 extends while being at a position opposite to the first compressor 41. The third compressor 43 further compresses the mixed refrigerant with rotation of the third compression unit rotor 431 to generate a compressed gas.

A third inlet flow path LI3 that connects a discharge port of the second compressor 42 and a suction port of the third compressor 43 to each other is connected to the third compressor 43. The third inlet flow path LI3 is a pipe through which the mixed refrigerant compressed in the second compressor 42 is supplied into the third compressor 43. A first cooling unit C1 that cools the mixed refrigerant compressed in the second compressor 42 is disposed in the third inlet flow path LI3. Therefore, through the third inlet flow path LI3, the mixed refrigerant compressed in the second compressor 42 is supplied to the third compressor 43 after being cooled by the first cooling unit C1.

In addition, the third compressor 43 is connected to a third outlet flow path LO3 through which the mixed refrigerant compressed in the third compressor 43 and discharged from a discharge port of the third compressor 43 flows. A second cooling unit C2 that cools the mixed refrigerant compressed in the third compressor 43 is disposed in the third outlet flow path LO3. Therefore, through the third outlet flow path LO3, the mixed refrigerant compressed in the third compressor 43 is sent to another facility in the plant after being cooled by the second cooling unit C2.

In addition, bypass flow paths that connect the suction port and the discharge port to each other are connected to the second compressor 42 so that the mixed refrigerant discharged from the discharge port of the second compressor 42 returns to the suction port of the second compressor 42. The compression unit 4 of the present embodiment includes a first bypass flow path LB1 through which the mixed refrigerant returns to the suction port of the second compressor 42 before being cooled by the first cooling unit C1 and a second bypass flow path LB2 through which the mixed refrigerant returns to the suction port of the second compressor 42 after being cooled by the first cooling unit C1, as the bypass flow paths.

The first bypass flow path LB1 is connected to a portion of the third inlet flow path LI3 that is positioned upstream of the first cooling unit C1 and to a portion of the second inlet flow path LI2 that is positioned downstream of the second inlet valve VI2 and upstream of the pressure sensor P. Therefore, the mixed refrigerant compressed in the second compressor 42 flows into the first bypass flow path LB1 before being cooled. That is, the first bypass flow path LB1 is a so-called hot gas bypass flow path. A first bypass valve VB1 is disposed in the first bypass flow path LB1. It is possible to change the flow rate of the mixed refrigerant flowing through the first bypass flow path LB1 by adjusting the opening degree of the first bypass valve VB1. Therefore, the amount of the mixed refrigerant supplied from the third inlet flow path LI3 to the suction port of the second compressor 42 is adjusted when the opening degree of the first bypass valve VB1 is adjusted.

The second bypass flow path LB2 is connected to a portion of the third inlet flow path LI3 that is positioned downstream of the first cooling unit C1 and to a portion of the second inlet flow path LI2 that is positioned downstream of the second inlet valve VI2 and upstream of the pressure sensor P. Therefore, the mixed refrigerant compressed in the second compressor 42 flows into the second bypass flow path LB2 after being cooled. A second bypass valve VB2 is disposed in the second bypass flow path LB2. It is possible to change the flow rate of the mixed refrigerant flowing through the second bypass flow path LB2 by adjusting the opening degree of the second bypass valve VB2. Therefore, the amount of the mixed refrigerant supplied from the third inlet flow path LI3 to the suction port of the second compressor 42 is adjusted when the opening degree of the second bypass valve VB2 is adjusted.

In addition, a bypass flow path that connects the suction port and the discharge port to each other is connected to the third compressor 43 as well so that the mixed refrigerant discharged from the discharge port of the third compressor 43 returns to the suction port of the third compressor 43. The compression unit 4 of the present embodiment further includes a third bypass flow path LB3 through which the mixed refrigerant returns to the suction port of the third compressor 43 after being cooled by the second cooling unit C2, as the bypass flow path.

The third bypass flow path LB3 is connected to a portion of the third outlet flow path LO3 that is positioned downstream of the second cooling unit C2 and to a portion of the third inlet flow path LI3 that is positioned downstream of the first cooling unit C1. Therefore, the mixed refrigerant compressed in the third compressor 43 flows into the third bypass flow path LB3 after being cooled. A third bypass valve VB3 is disposed in the third bypass flow path LB3. It is possible to change the flow rate of the mixed refrigerant flowing through the third bypass flow path LB3 by adjusting the opening degree of the third bypass valve VB3. Therefore, the amount of the mixed refrigerant supplied from the third outlet flow path LO3 to the suction port of the third compressor 43 is adjusted when the opening degree of the third bypass valve VB3 is adjusted.

The first compressor 41, the second compressor 42, and the third compressor 43 are connected in series in a direction in which the second axis O2 extends. The first compressor 41, the second compressor 42, and the third compressor 43 are driven by means of rotation of the second rotor 20.

(Fluid Supply Unit)

Each fluid supply unit 5 includes one fluid supply source. The fluid supply units 5 can distribute and supply a fluid supplied from the fluid supply source to the compressors in the plurality of compressor trains 2. The compressor system 1 of the present embodiment includes the first fluid supply unit 5A and the second fluid supply unit 5B as the fluid supply units 5.

The first fluid supply unit 5A of the present embodiment supplies propane to the first compressor 41 as the fluid. The first fluid supply unit 5A has a first fluid supply source 511, a first supply path 512, and a first branch path 513.

The first fluid supply source 511 is a propane supply source. Only the first fluid supply source 511 is the first fluid supply source in the first fluid supply unit 5A. The first supply path 512 is a pipe through which propane of the first fluid supply source 511 is supplied to the first compressor 41 of the first compressor train 2A. The first supply path 512 connects the first fluid supply source 511 to the first inlet flow path LI1 and the first intermediate flow path LM1 of the first compressor train 2A. The first branch path 513 is a pipe through which the propane of the first fluid supply source 511 is distributed and supplied to the first compressor 41 of the second compressor train 2B. The first branch path 513 connects the first supply path 512 to the first inlet flow path LI1 and the first intermediate flow path LM1 of the second compressor train 2B.

The second fluid supply unit 5B is independent of the first fluid supply unit 5A and can supply a fluid under different conditions from those of the first fluid supply unit 5A. The second fluid supply unit 5B of the present embodiment supplies a mixed refrigerant to the second compressor 42 as the fluid. The second fluid supply unit 5B includes a second fluid supply source 521, a second supply path 522, and a second branch path 523.

The second fluid supply source 521 is a mixed refrigerant supply source. Only the second fluid supply source 521 is the first fluid supply source in the second fluid supply unit 5B. The second supply path 522 is a pipe through which the mixed refrigerant of the second fluid supply source 521 is supplied to the second compressor 42 of the first compressor train 2A. The second supply path 522 connects the second fluid supply source 521 to the second inlet flow path LI2 of the first compressor train 2A. The second branch path 523 is a pipe through which the mixed refrigerant of the second fluid supply source 521 is distributed and supplied to the second compressor 42 of the second compressor train 2B. The second branch path 523 connects the second supply path 522 to the second inlet flow path LI2 of the second compressor train 2B.

(Control Unit)

The control unit 6 can control the operating conditions of the plurality of compressor trains 2. The control unit 6 of the present embodiment can control the first compressor train 2A and the second compressor train 2B independently of each other at the same time. The control unit 6 can control the two-shaft gas turbine 3 and the compression unit 4 of each of the compressor trains 2. Specifically, the control unit 6 monitors the state of operation of the compressor trains 2 and sends an instruction to each valve. Accordingly, in a case where one of the plurality of compressor trains 2 is stopped, the control unit 6 sends, to another compressor train 2 that is not stopped, an instruction to perform at least one of "increasing the flow rate of a fluid supplied to at least one compressor", "increasing the amount of a compressed fluid returning to at least one compressor", "increasing energy applied to the high-pressure turbine rotor 312", and "increasing the rotation speed of the low-pressure turbine rotor 313".

Note that the control unit 6 may send an instruction to perform all of the four operations described above or may send an instruction to perform only one of the four operations.

The control unit 6 of the present embodiment includes an input unit 61, a determination unit 62, a first output unit 63, a second output unit 64, a third output unit 65, and a fourth output unit 66.

Information about the state of operation of the first compressor train 2A and the second compressor train 2B is input to the input unit 61. The information about the state of operation of the first compressor train 2A and the second compressor train 2B is information about a stoppage signal from the first compressor train 2A and the second compressor train 2B and information about a pressure acquired by the pressure sensor P.

The determination unit 62 determines, based on the information about the stoppage signal of the first compressor train 2A and the second compressor train 2B that is input to the input unit 61, whether or not the first compressor train 2A and the second compressor train 2B have been stopped. In a case where it is determined that any of the first compressor train 2A and the second compressor train 2B has been stopped, information about which compressor train 2 has been stopped is output to the first output unit 63, the second output unit 64, and the third output unit 65.

Further, the determination unit 62 determines whether or not a pressure value exceeds a predetermined reference value. Here, the reference value is a value at which it is determined that an abnormality has occurred due to an excessive load acting on the second compressor 42. The reference value of the present embodiment is, for example, a value at which it can be determined that the pressure value is obviously higher than a pressure acquired in a case where the second compressor 42 is normally operated. In a case where it is determined that the pressure value exceeds the reference value, information about in which compressor train 2 the pressure of the second compressor 42 is abnormal is output to the fourth output unit 66.

Hereinafter, a case where the second compressor train 2B is stopped and the first compressor train 2A continues to be operated will be described as an example. In a case where the determination unit 62 determines that the second compressor train 2B has been stopped or that an abnormality has occurred in the second compressor 42 of the second compressor train 2B, an instruction targeted on the first compressor train 2A is sent to the first output unit 63, the second output unit 64, the third output unit 65, and the fourth output unit 66.

Based on a signal sent from the determination unit 62, the first output unit 63 sends an instruction to be opened to at least one of the first bypass valve VB1, the second bypass valve VB2, and the third bypass valve VB3 of the first compressor train 2A. Accordingly, the amount of the mixed refrigerant returning to the suction port of at least one of the second compressor 42 and the third compressor 43 is increased.

Based on a signal sent from the determination unit 62, the second output unit 64 sends an instruction to be tightened to at least one of the first inlet valve VI1 and the first intermediate valve VM1 of the first compressor train 2A. Accordingly, the flow rate of the propane supplied to the first compressor 41 can be decreased.

Based on a signal sent from the determination unit 62, the third output unit 65 sends an instruction to increase the opening degree to the fuel supply valve VF1 of the first compressor train 2A. Accordingly, the amount of fuel supplied to the combustor 32 increases, energy applied to the high-pressure turbine rotor 312 increases, and the rotation speed of the low-pressure turbine rotor 313 increases.

Based on a signal sent from the determination unit 62, the fourth output unit 66 sends an instruction to increase the opening degree to the fuel supply valve VF1 of the first compressor train 2A. At this time, the opening degree of the fuel supply valve VF1 is adjusted such that the pressure value acquired by the pressure sensor P is decreased to a certain value. Accordingly, the amount of fuel supplied to the combustor 32 increases, energy applied to the high-pressure turbine rotor 312 increases, and the rotation speed of the low-pressure turbine rotor 313 increases.

Note that, even in a case where the first compressor train 2A is stopped and the second compressor train 2B continues to be operated, only the target of instruction is changed from the first compressor train 2A to the second compressor train 2B and the same processes as above are performed in the first output unit 63, the second output unit 64, the third output unit 65, and the fourth output unit 66.

(Action and Effect)

In the case of the compressor system 1, the first rotor and the second rotor 20 in each of the plurality of compressor trains 2 are operated at the same rotation speed when the plurality of compressor trains 2 are operated in parallel. At this time, a problem such as a malfunction of a device such as a valve may occur. As a result, a balance between processes of some of the compressors of the compressor train 2, in which a problem has occurred, is lost. In the case of such a state, a load on a compressor normally operated increases temporarily, which causes a decrease in rotation speed of the compressor. In a case where a single-shaft gas turbine 3 is applied, the entire compressor train 2 may be stopped since the gas turbine 3 can be operated only at a certain rotation speed (substantially rated speed). However, in the case of the compressor system 1 configured as described above, the two-shaft gas turbine 3 is applied for every compressor train 2. Therefore, the first rotor and the second rotor 20 connected from the first compressor 41 to the third compressor 43 can be operated at different rotation speeds. That is, speed adjustment can be performed in a wider operation range. Therefore, it is possible to suppress unintentional stoppage of the compressor trains 2 and operation can be stably continued.

In addition, since the two-shaft gas turbine 3 is applied, it is possible to decrease the number of safety valves or recycle valves effective for suppressing a fluctuation in load on the compressors and thus it is possible to suppress the cost of the compressor system 1. Furthermore, it is possible to cope with a fluctuation in load on the compressors with a wide operation range of the two-shaft gas turbine 3. Therefore, it is possible to suppress the frequency of simulation for testing a fluctuation in load when designing the compressor system 1 and the design work can be simplified.

In addition, in a case where any one of the first compressor train 2A and the second compressor train 2B is stopped, the control unit 6 sends an instruction to open the first bypass valve VB1, the second bypass valve VB2, and the third bypass valve VB3. As a result, in a case where any of the first bypass valve VB1 and the second bypass valve VB2 is opened, the amount of the compressed mixed refrigerant supplied to the suction port of the second compressor 42 is increased. In addition, in a case where the third bypass valve VB3 is opened, the amount of the compressed mixed refrigerant supplied to the suction port of the third compressor 43 is increased. That is, the amount of the mixed refrigerant returning to the second compressor 42 and the third compressor 43 is increased and the amount of the mixed refrigerant newly supplied can be suppressed. Therefore, an increase in load on the second compressor 42 and the third compressor 43 can be suppressed. As a result, the rate of decrease in rotation speed of the second rotor 20 caused by the second compressor 42 and the third compressor 43 can be alleviated. As a result, it is possible to suppress unintentional stoppage of the compressor train 2 normally operated.

Note that it is possible to quickly decrease a load on the second compressor 42 and the third compressor 43 by using feedforward control by means of the control unit 6 when opening the first bypass valve VB1, the second bypass valve VB2, and the third bypass valve VB3.

Furthermore, the control unit 6 performs control to open any of the first bypass valve VB1, the second bypass valve VB2, and the third bypass valve VB3. Accordingly, it is possible to easily increase the amount of the mixed refrigerant returning to the suction port of the second compressor 42 or the third compressor 43 that is in operation, in response to stoppage of the compressor train 2.

In addition, in a case where any of the first compressor train 2A and the second compressor train 2B is stopped, the control unit 6 sends an instruction to loosen the fuel supply valve VF1. As a result, the amount of fuel supplied to the combustor 32 increases and thus energy applied to the high-pressure turbine rotor 312 increases. As a result, the rotation speed of the low-pressure turbine rotor 313 also increases and a decrease in rotation speed of the second rotor 20 can be suppressed. As a result, the rate of decrease in rotation speed of the second rotor 20 can be alleviated even in a case where a load on the first compressor 41, the second compressor 42, and the third compressor 43 increases. As a result, it is possible to suppress unintentional stoppage of the compressor train 2 normally operated.

In addition, in a case where any of the first compressor train 2A and the second compressor train 2B is stopped, the control unit 6 sends an instruction to tighten any of the first inlet valve VI1 and the first intermediate valve VM1. As a result, in a case where any of the first inlet valve VI1 and the first intermediate valve VM1 is tightened, the amount of propane supplied into the first compressor 41 is decreased.

Therefore, the amount of propane compressed by the first compressor 41 is decreased and an increase in load on the first compressor 41 is suppressed. As a result, the rate of decrease in rotation speed of the second rotor 20 caused by the first compressor can be alleviated. As a result, it is possible to suppress unintentional stoppage of the compressor train 2 normally operated.

Furthermore, the control unit 6 performs control to tighten any of the first inlet valve VI1 and the first intermediate valve VM1. Accordingly, it is possible to easily decrease the amount of propane supplied to the first compressor 41 that is in operation, in response to stoppage of the compressor train 2.

Note that, a method for decreasing the amount of propane supplied to the suction port of the first compressor 41 is not limited to adjusting the opening degrees of the first inlet valve VI1 and the first intermediate valve VM1. For example, an operator may send, to the first compressor 41, an instruction to decrease the flow rate of propane discharged from the discharge port of the first compressor 41 via the control unit 6. That is, an instruction to lower the value of the amount of required LNG production in an LNG plant may be sent.

In addition, in a case where information about a pressure acquired by the pressure sensor P exceeds the reference value in any of the first compressor train 2A and the second compressor train 2B, the control unit 6 sends an instruction to loosen the fuel supply valve VF1. In a case where any of the first compressor train 2A and the second compressor train 2B is stopped, the rotation speed of the second rotor 20 of the compressor train 2 normally operated is decreased and thus the suction pressure in each compressor is increased. As a result, the information about the pressure acquired by the pressure sensor P indicates a higher value than usual. In such a case, the fuel supply valve VF1 is opened so that the amount of fuel supplied to the combustor 32 increases, energy applied to the high-pressure turbine rotor 312 increases, and the rotation speed of the low-pressure turbine rotor 313 increases. Therefore, it is possible to suppress a decrease in rotation speed of the second rotor 20. As a result, the rate of decrease in rotation speed of the second rotor 20 can be alleviated even in a case where a load on the first compressor 41, the second compressor 42, and the third compressor 43 increases. As a result, it is possible to suppress unintentional stoppage of the compressor train 2 normally operated.

Note that it is possible to quickly increase the rotation speed of the low-pressure turbine rotor 313 by increasing the gain (sensitivity) of PID control by means of the control unit 6 when loosening a fuel supply source valve based on information about a pressure acquired by the pressure sensor P.

Modification Example of Embodiment

Hereinabove, the embodiment of the present disclosure has been described in detail with reference to the drawings. However, a specific configuration is not limited to the embodiment, and design changes can be made without departing from the gist of the present disclosure.

For example, the compressor system 1 of the present embodiment includes the two compressor trains 2. However, the number of the compressor trains 2 is not limited thereto. The number of the compressor trains 2 may be three or more as long as a plurality of the compressor trains 2 are provided. In a case where the number of the compressor trains 2 is three or more, the number of compressor trains operated in parallel is increased. As a result, it is possible to compensate for a load in the case of stoppage of one compressor train 2 by means of two or more compressor trains 2. Therefore, the compressor system 1 can be operated more stably.

In addition, the plurality of compressor trains 2 may not have the same configurations as each other as in the present embodiment and the compressor trains 2 may have different configurations. Therefore, the plurality of compressor trains 2 may be different from each other in configurations of the gas turbine 3 and the compression unit 4, required output, type of a fluid to be compressed, and the like.

In addition, the compressor system 1 of the present embodiment includes the two fluid supply units 5. However, the number of the fluid supply units 5 is not limited thereto. An appropriate number of the fluid supply units 5 may be disposed in accordance with the type (type of fluid compressed by compression units 4) of a fluid supplied to the compression units 4 as long as at least one fluid supply unit 5 is provided.

In addition, the configurations of the compressors in the compression unit 4 are not limited to the configurations in the present embodiment. The compression unit 4 may include four or more compressors as long as the compression unit 4 includes at least one compressor.

In addition, the configurations of the bypass flow paths are not limited to the configurations in the present embodiment. The bypass flow paths may not be provided in the compression unit 4 and a plurality of bypass flow paths may be provided for each compressor.

In addition, the configuration of the control unit 6 is not limited to the configuration in the present embodiment. The control unit 6 may include another control device that individually controls the first compressor train 2A and the second compressor train 2B.

In addition, information about the state of operation of the first compressor train 2A and the second compressor train 2B that is input to the control unit 6 is not limited to the information as described in the present embodiment. The information about the state of operation of the first compressor train 2A and the second compressor train 2B only has to be information indicating that the compressor train 2 is stopped and information indicating that the compressor train 2 is in an abnormal state. Therefore, as the information about the state of operation of the first compressor train 2A and the second compressor train 2B, information about the rotation speeds of the first rotor 10 and the second rotor 20 or information about the output of the two-shaft gas turbine 3 or each compressor may be input to the input unit 61, for example.

In addition, information input to the control unit 6 may not be both of information about the stoppage signal of the first compressor train 2A and the second compressor train 2B and information about a pressure acquired by the pressure sensor P. Information input to the input unit 61 may be only one of the information about the stoppage signal of the first compressor train 2A and the second compressor train 2B and the information about a pressure acquired by the pressure sensor P.

In addition, the information about the state of operation of the first compressor train 2A and the second compressor train 2B is not limited to use of the pressure sensor P only. Therefore, not only information about a pressure acquired by the pressure sensor P but also information about a flow rate or a temperature may be input to the input unit 61.

APPENDIX

The compressor system 1 described in the embodiment is understood as follows, for example.

(1) The compressor system 1 according to a first aspect includes the plurality of compressor trains 2 each of which includes the two-shaft gas turbine 3 and the compression unit 4 including at least one compressor driven by the two-shaft gas turbine 3 and the fluid supply unit 5 that includes one fluid supply source and distributes and supplies a fluid supplied from the fluid supply source to each of the compressors of the plurality of compressor trains 2. The two-shaft gas turbine 3 includes the gas turbine compressor 31 that includes the compressor rotor 311 and compresses air with rotation of the compressor rotor 311, the combustor that produces a combustion gas by using the air compressed by the gas turbine compressor 31 and fuel, the high-pressure turbine 34 that includes the high-pressure turbine rotor 312 that is mechanically connected to the compressor rotor 311 and is rotationally driven by the combustion gas, and the low-pressure turbine 35 that includes the low-pressure turbine rotor 313 disposed to be separated from the high-pressure turbine rotor 312 and rotationally driven by the combustion gas after the high-pressure turbine rotor 312 is rotationally driven, and the plurality of compressor trains 2 are able to be operated in parallel.

According to such a configuration, the low-pressure turbine rotor 313 connected to the plurality of compressors and the compressor rotor 311 and the high-pressure turbine rotor 312 can be operated at different rotation speeds. That is, speed adjustment can be performed in a wider operation range. Therefore, it is possible to suppress unintentional stoppage of the compressor trains 2 and operation can be stably continued.

(2) According to a second aspect, the compressor system 1 of (1) may further include the control unit 6 that is able to control operating conditions of the plurality of compressor trains 2 and in a case where one of the plurality of compressor trains 2 is stopped, the control unit 6 may increase an amount of a fluid returning to a suction port of the compressor after being compressed by the compressor for another compressor train 2 that is not stopped.

According to such a configuration, the amount of the fluid returning to the compressor increases. That is, the amount of the fluid newly supplied to the compressor can be suppressed. Therefore, an increase in load on the compressor can be suppressed. As a result, the rate of decrease in rotation speed of the low-pressure turbine rotor 313 caused by the compressor can be alleviated. As a result, it is possible to suppress unintentional stoppage of the compressor train 2 normally operated.

(3) According to a third aspect, in the compressor system 1 of (2), the compression unit 4 may include a bypass flow path that connects the suction port of the compressor and a discharge port of the compressor such that the fluid discharged from the discharge port of the compressor returns to the suction port of the compressor and a bypass valve that is disposed in the bypass flow path and is able to adjust a flow rate of the fluid flowing through the bypass flow path and in a case where one of the plurality of compressor trains 2 is stopped, the control unit 6 may send an instruction to increase an opening degree of the bypass valve of the compression unit 4 of another compressor train 2 that is not stopped so that the flow rate of the fluid flowing through the bypass flow path is increased.

According to such a configuration, it is possible to easily increase the amount of the fluid returning to the compressor that is in operation, in response to stoppage of the compressor train 2.

(4) According to a fourth aspect, the compressor system 1 of (1) may further include the control unit 6 that is able to control operating conditions of the plurality of compressor trains 2 and in a case where one of the plurality of compressor trains 2 is stopped, the control unit 6 may increase energy applied to the high-pressure turbine rotor 312 of another compressor train 2 that is not stopped.

According to such a configuration, the rotation speed of the low-pressure turbine rotor 313 is also increased and a decrease in rotation speed in the compression unit 4 can be suppressed. As a result, even in a case where a load on the compressor increases, the rate of decrease in rotation speed in the compression unit 4 can be alleviated. As a result, it is possible to suppress unintentional stoppage of the compressor train 2 normally operated.

(5) According to a fifth aspect, the compressor system 1 of (1) may further include the control unit 6 that is able to control operating conditions of the plurality of compressor trains 2. The compression unit 4 may include a pressure value acquisition unit that acquires a value of a pressure at a suction port of the compressor and sends information about the value of the pressure to the control unit 6 and in a case where the value of the pressure acquired by the pressure value acquisition unit in one of the plurality of compressor trains 2 exceeds a reference value determined in advance, the control unit 6 may increase a rotation speed of the low-pressure turbine rotor 313 of another compressor train 2.

According to such a configuration, it is possible to suppress a decrease in rotation speed of the low-pressure turbine rotor 313. As a result, even in a case where a load on the compressor increases, the rate of decrease in rotation speed of the low-pressure turbine rotor 313 can be alleviated. As a result, it is possible to suppress unintentional stoppage of the entire compressor train 2 normally operated.

(6) According to a sixth aspect, the compressor system 1 of (1) may further include the control unit 6 that is able to control operating conditions of the plurality of compressor trains 2 and in a case where one of the plurality of compressor trains 2 is stopped, the control unit 6 may decrease a flow rate of the fluid supplied to the compressor of another compressor train 2 that is not stopped.

According to such a configuration, the amount of the fluid compressed by the compressor is decreased and an increase in load on the compressor is suppressed. As a result, the rate of decrease in rotation speed in the compression unit 4 caused by the compressor can be alleviated. As a result, it is possible to suppress unintentional stoppage of the entire compressor train 2 normally operated.

(7) According to a seventh aspect, in the compressor system 1 of (6), the compression unit 4 may include an inlet flow path that is connected to the fluid supply unit 5 and through which the fluid is supplied into the compressor and an inlet valve that is disposed in the inlet flow path and is able to adjust a flow rate of the fluid flowing through the inlet flow path and in a case where one of the plurality of compressor trains 2 is stopped, the control unit 6 may send an instruction to decrease an opening degree of the inlet valve of the compression unit 4 of another compressor train 2 that is not stopped so that the flow rate of the fluid flowing through the inlet flow path is decreased.

According to such a configuration, it is possible to easily decrease the amount of the fluid supplied to the compressor that is in operation, in response to stoppage of the compressor train 2.

INDUSTRIAL APPLICABILITY

According to a compressor system of the present disclosure, it is possible to suppress unintentional stoppage of a compressor train and operation can be stably continued.

REFERENCE SIGNS LIST

1: compressor system
2: compressor train
2A: first compressor train
2B: second compressor train
3: gas turbine
31: gas turbine compressor
O1: first axis
311: compressor rotor
32: combustor
LF1: fuel supply path
VF1: fuel supply valve
34: high-pressure turbine
312: high-pressure turbine rotor
10: first rotor
35: low-pressure turbine
O2: second axis
313: low-pressure turbine rotor
20: second rotor
4: compression unit
41: first compressor
411: first compression unit rotor
LI1: first inlet flow path
VI1: first inlet valve
LM1: first intermediate flow path
VM1: first intermediate valve
42: second compressor
421: second compression unit rotor
LI2: second inlet flow path
VI2: second inlet valve
P: pressure sensor
43: third compressor
431: third compression unit rotor
LI3: third inlet flow path
C1: first cooling unit
LO3: third outlet flow path
C2: second cooling unit
LB1: first bypass flow path
VB1: first bypass valve
LB2: second bypass flow path
VB2: second bypass valve
LB3: third bypass flow path
VB3: third bypass valve
5: fluid supply unit
5A: first fluid supply unit
511: first fluid supply source
512: first supply path
513: first branch path
5B: second fluid supply unit
521: second fluid supply source
522: second supply path
523: second branch path
6: control unit
61: input unit
62: determination unit
63: first output unit
64: second output unit
65: third output unit
66: fourth output unit

The invention claimed is:

1. A compressor system comprising:
compressor trains each of which comprises:
a multi-shaft gas turbine; and
a compression unit comprising a first compressor and a second compressor both driven by the multi-shaft gas turbine, wherein the second compressor compresses a different fluid than the first compressor does;
a first fluid supply unit that:
comprises a fluid supply source, and
distributes and supplies a fluid supplied from the fluid supply source to the first compressor of each of the compressor trains,
a second fluid supply unit that:
is independent of the first fluid supply unit, and
distributes and supplies the different fluid under different conditions to the second compressor of each of the compressor trains, and
a control unit configured to control operating conditions of the compressor trains, wherein
the multi-shaft gas turbine of each of the compressor trains comprises:
a gas turbine compressor that:
comprises a compressor rotor, and
compresses air with rotation of the compressor rotor;
a combustor that produces a combustion gas by using:
the air compressed by the gas turbine compressor, and fuel;
a high-pressure turbine that comprises a high-pressure turbine rotor that:
is mechanically connected to the compressor rotor, and
is rotationally driven by the combustion gas; and
a low-pressure turbine that comprises a low-pressure turbine rotor:
disposed separately from the high-pressure turbine rotor, and
rotationally driven by the combustion gas after the high-pressure turbine rotor is rotationally driven,
the low-pressure turbine rotor rotates independently of the high-pressure turbine rotor,
the compression unit of each of the compressor trains further comprises a pressure sensor that:
acquires a pressure value of a pressure at a suction port of the second compressor, and
sends information about the pressure value to the control unit,
a first compression unit rotor of the first compressor is mechanically connected to the low-pressure turbine rotor,
a second compression unit rotor of the second compressor is mechanically connected to the first compression unit rotor,
the compressor trains are configured to operate independently or in parallel,
the compressor trains include a first compressor train and a second compressor train,
the control unit is configured to decrease, in response to stoppage of the second compressor train while the first compressor train continues to operate, a flow rate of the fluid supplied to the first compressor of the operating first compressor train, and:

the control unit is configured to increase, in response to the pressure value acquired in the operating first compressor train exceeding a predetermined reference value, an amount of the fuel supplied to the combustor of the operating first compressor train to increase a rotation speed of the low-pressure turbine rotor of the operating first compressor train.

2. The compressor system according to claim 1, wherein the control unit is configured to increase, in the operating first compressor train in response to the stoppage of the second compressor train, an amount of the different fluid returning to the suction port of the second compressor after being compressed by the second compressor.

3. The compressor system according to claim 2, wherein the compression unit comprises:
 a bypass flow path that connects the suction port of the second compressor and a discharge port of the second compressor such that the different fluid discharged from the discharge port of the second compressor returns to the suction port of the second compressor; and
 a bypass valve in the bypass flow path that adjusts a flow rate of the different fluid flowing through the bypass flow path, and
the control unit is configured to send, in response to the stoppage of the second compressor train, an instruction to increase an opening degree of the bypass valve of the compression unit of the operating first compressor train such that the flow rate of the different fluid flowing through the bypass flow path is increased.

4. The compressor system according to claim 1, wherein the control unit is configured to increase, in response to the stoppage of the second compressor train, energy applied to the high-pressure turbine rotor of the operating first compressor train.

5. The compressor system according to claim 1, wherein the compression unit comprises:
 an inlet flow path connected to the first fluid supply unit and through which the fluid is supplied into the first compressor; and
 an inlet valve in the inlet flow path that adjusts the flow rate of the fluid flowing through the inlet flow path, and
the control unit is configured to send, in response to the stoppage of the second compressor train, an instruction to decrease an opening degree of the inlet valve of the compression unit of the operating first compressor train such that the flow rate of the fluid flowing through the inlet flow path is decreased.

* * * * *